(12) United States Patent
Beck et al.

(10) Patent No.: US 7,941,834 B2
(45) Date of Patent: May 10, 2011

(54) SECURE WEB-BASED USER AUTHENTICATION

(75) Inventors: Robert L. Beck, Seattle, WA (US); Benjamin Fullerton, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 937 days.

(21) Appl. No.: 11/696,907

(22) Filed: Apr. 5, 2007

(65) Prior Publication Data

US 2008/0250481 A1    Oct. 9, 2008

(51) Int. Cl.
*H04L 9/00* (2006.01)
(52) U.S. Cl. .......................................................... 726/6
(58) Field of Classification Search .................. 726/2, 4, 726/6
See application file for complete search history.

(56) References Cited

U.S. PATENT DOCUMENTS

| | | | |
|---|---|---|---|
| 5,664,099 A * | 9/1997 | Ozzie et al. ..................... 726/29 |
| 2004/0030933 A1* | 2/2004 | Park ............................. 713/202 |
| 2004/0049685 A1* | 3/2004 | Jaloveczki ..................... 713/182 |
| 2004/0059951 A1* | 3/2004 | Pinkas et al. .................. 713/202 |
| 2004/0119746 A1* | 6/2004 | Mizrah ......................... 345/763 |
| 2004/0133778 A1* | 7/2004 | Madani ........................ 713/168 |
| 2006/0020815 A1* | 1/2006 | Varghese et al. ............. 713/182 |

* cited by examiner

*Primary Examiner* — Ellen Tran
(74) *Attorney, Agent, or Firm* — Lee & Hayes, PLLC (57) ABSTRACT

Techniques for authenticating a user are described. In one implementation, a user requests access to protected information or resources by providing a user name and a password to a web server that controls access to the information or resources. If the user name and password match a known user profile, the web server retrieves a user identifier (e.g., a personal identification number) and constructs a translation table around the user identifier. The translation table includes the values that constitute the user identifier, random representations of each value, visual images that represent each value, and random image names for each visual image. The information in the translation table is then used to generate a user interface that allows the user to enter his or her user identifier via the user's computing device without exposing the actual user identifier values to the computing device.

20 Claims, 9 Drawing Sheets

IMAGE STORE 400

| VALUE | IMAGE FILES |
|---|---|
| 0 | |
| 1 | |
| 2 | |
| 3 | |
| | . . . n |

SECURE WEB-BASED USER AUTHENTICATION

BACKGROUND

Security concerns present a significant obstacle to the advancement of online business. Authenticating clientele while protecting clientele identity is particularly crucial in the areas of online banking and financial management. To address these concerns, most online enterprises utilize some form of authentication to verify the identity of their clientele. Some of the most common forms of authentication require a user to provide a user name and a password to a host website before the user is given access to sensitive information or resources. The user name and password are authenticated to determine if they match the profile of a legitimate user. To further enhance this authentication process, a host website may also require a user to enter some form of a user identifier (e.g., a personal identification number (PIN)) that must correlate with the user name and password for the user to successfully be authenticated.

Despite the apparent security provided by these authentication methods, many of these methods are vulnerable to attack by entities that wish to intercept the authentication information provided by a user. If an entity successfully intercepts this information, such as a user name, password, and user identifier, the entity can then fraudulently identify itself as the legitimate user and impermissibly gain access to sensitive information and/or valuable resources. Attacks on authentication processes may take the form of malicious software, or "malware", such as key logging software, spyware, adware, and other pernicious software that may reside on a user's computer and/or a server. For example, if a user's computer is infected with key logging software, an entity can observe a user's keystrokes during an authentication session and based on the keys pressed by the user, team the user's user name, password, and user identifier. Other forms of attack monitor screen-based input, such as the selection of hypertext markup language (HTML) input controls on an HTML PIN pad. If an entity can intercept a value associated with a selected HTML input control, the entity may be able to glean important user authentication information from it.

SUMMARY

Techniques for authenticating a user are described. In one implementation, a user requests access to protected information or resources by providing a user name and a password to a web server that controls access to the information or resources. If the user name and password match a known user profile, the web server retrieves a user identifier (e.g., a personal identification number) and constructs a translation table around the user identifier. The translation table includes the values that constitute the user identifier, random representations of each value, visual images that represent each value, and random image names for each visual image. The information in the translation table is then used to generate a user interface that allows the user to enter his or her user identifier via the user's computing device without exposing the actual user identifier values to the computing device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

The processes and techniques described herein create a robust and secure user authentication environment. A user identifier (e.g., a personal identification number or "PIN") is obfuscated by generating and discarding random representations of user identifier values on a per-transaction basis. Also, an assortment of visual images is associated with the user identifier to generate a wide variety of different user authentication interfaces. By using an array of user authentication interfaces, no detectable patterns are introduced into the user authentication process. As a further aspect, sensitive user information, including the underlying values that form the user identifier, is not exposed to a user's computing device. This prevents malicious software or other security threats with access to the user's computer from obtaining the user's identifier. Thus, the user can engage in online transactions (e.g., online banking) without unintentionally revealing his or her user identifier to third parties.

The processes and techniques discussed herein are presented in the context of user authentication transactions that occur between a web client and a web server over the internet. This is for purposes of example only, and other suitable environments may utilize the discussed techniques, such as intranets, extranets, LANs and the like. For example, the discussed techniques may be used by a bank to authenticate users of an automated teller machine (ATM).

Figure 1:
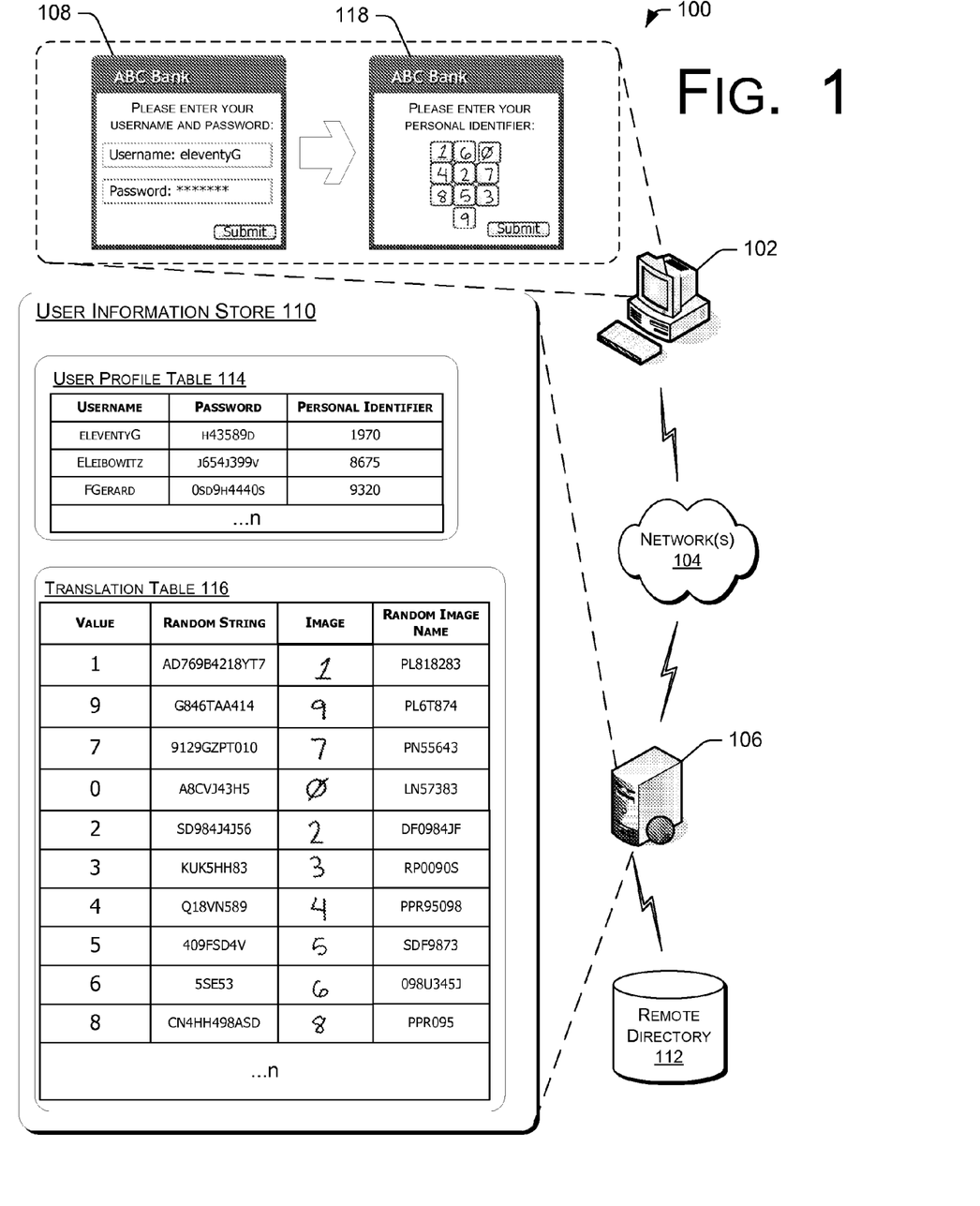
FIG. 1 illustrates an exemplary architecture for implementing techniques to authenticate a user.

FIG. 1 shows an architecture 100 that can implement the described processes and techniques. For discussion purposes, architecture 100 includes at least one computing device 102 that connects through a network 104 to access one or more websites hosted by web server 106. Computing device 102 is configurable to access the websites over network 104. Although illustrated as a desktop PC, computing device 102 may be implemented as any of a variety of conventional computing devices including, for example, a server, a notebook or portable computer, a workstation, a mainframe computer, a mobile communication device, a PDA, an entertainment device, a set-top box, an Internet appliance, a game console, and so forth.

Although not expressly illustrated here, computing device 102 can include, but is not limited to, one or more processors, a memory, Input/Output (I/O) devices (e.g., keyboard and mouse), and a system bus that operatively couples various components including the processor(s) to the memory. The memory of computing device 102 includes computer-readable media in the form of volatile memory, such as Random Access Memory (RAM) and/or non-volatile memory, such as Read Only Memory (ROM) or flash RAM. The memory typically includes data and/or program modules for an authentication tool that are immediately accessible to and/or presently operated on by the processor(s).

Network 104 represents any number of network configurations. It may be a wired network, a wireless network, or a combination thereof. Network 104 may further be a collection of individual networks, interconnected with each other and functioning as a single large network (e.g., the Internet or an intranet). Examples of such individual networks include, but are not limited to, Local Area Networks (LANs), Wide Area Networks (WANs), Metropolitan Area Networks (MANs), cellular networks, satellite networks, and cable networks.

In operation, a user enters a request to view account information using computing device 102. For instance, the account information may be the user's account with a financial institution. The user's request is sent to server 106 via network 104. Web server 106 responds to the user's request by sending authentication request interface 108. Authentication request interface 108 prompts the user to enter his or her user name and password. In the illustrated example, the user enters a user name of "eleventyG" in an entry area of interface 108. Once he or she enters his or her user name and password, the user clicks the submit button on authentication request interface 108. The user name and password are returned to server 106, which then accesses user information store 110. The user information store may reside on web server 106 or may optionally reside at a remote resource, such as remote directory 112.

User information store 110 includes user profile table 114 that maintains a collection of user profiles containing various user information. As illustrated, each user profile correlates user authentication information, such as a user name, password, and a user identifier (hereinafter "user ID") associated with each user. If the user name and password provided by the user match a user profile in user profile table 114, components within web server 106 retrieve a personal identifier or user ID associated with the user. In this example, in response to the user submitting the user name "eleventyG" and the password "h43589d", web server 106 searches user profiles in user profile table 114 to identify a matching profile and retrieves the corresponding user ID "1970".

Once web server 106 retrieves the user ID, components within web server 106 construct translation table 116 that converts the user ID into a set of random representations, images and/or symbols to be provided as part of the authentication process in an effort to thwart attacks. Translation table 116 includes values that constitute the user ID, as in this example, the values one (1), nine (9), seven (7), and zero (0). Translation table 116 further includes other values, such as the values two (2), three (3), four (4), five (5), six (6), eight (8), and the like. Web server 106 generates a random representation of each user ID value in translation table 116, shown here as a "random string", and correlates each random representation with its respective user ID value in translation table 116. The random representation may be a random character string or any other random collection of data that can be used to represent the individual user ID values. Thus, as shown, the value one (1) is represented by the random string AD769B4218YT7, the value nine (9) is represented by the random string G846TAA414, and so on.

Web server 106 selects a visual image that is a graphical representation of each value and correlates each visual image with its respective user ID value in translation table 116. Thus, as shown, visual images for the values one (1), nine (9), seven (7), zero (0), and so on, are selected and stored in translation table 116. Finally, web server 106 generates a random image name for each selected visual image and correlates each random image name with its respective visual image in translation table 116. Once constructed, translation table 116 includes (1) an assortment of values that includes the values that constitute the user's user ID, (2) random representations for each value, (3) visual images for each value, and (4) random image names for each visual image.

From translation table 116, web server 106 compiles the visual images in a random or pseudo-random visual arrangement or pattern and generates second or user ID interface 118 which includes this arrangement. User ID interface 118 is sent to computing device 102 and displayed to the user. Notice that the visual images of the values are not arranged in a normal 10-key arrangement, but instead are arranged randomly. The user is prompted to enter his or her user ID or PIN by selecting one or more of the visual images displayed on user ID interface 118. The user may enter his or her user ID by pointing to certain images on the user interface using a mouse pointer and, using a mouse, clicking on the images in the order that corresponds to his or her user ID. Some embodiments may utilize other input methods, such as touch screens, light pens, and the like. Accordingly, if the user's user ID is "1970", the user would select the corresponding images in that order. It is noted that when the visual images in PIN authentication interface 118 are sent to computing device 102, the visual images have their corresponding random image names.

Once the user has entered his or her user ID via PIN authentication interface 118, the user selects the "submit" button to submit the selected user ID to web server 106. Web server 106 uses translation table 116 to translate the random image names associated with the selected images into the values that correspond to the selected images. Thus, if the user selects the visual image "1", computing device 102 communicates this selection to web server 106 as random image name PL818283, and so on with the remaining selected visual images. Alternatively and/or additionally, the user's selection may be communicated to web server 106 using the random representations of the values from translation table 116. Accordingly, web server 106 determines if the visual images selected by the user correspond to the user ID for that user, as determined by the user's profile in user profile table 114. If the user has entered the correct user ID, web server 106 authenticates the user and grants the user the requested access. Otherwise, if the user has failed to enter the correct user ID, web server 106 notifies the user that an incorrect user ID has been provided and either prompts the user to reenter his or her user ID or ends the authentication process without granting the requested access.

Whether or not the user provides the correct user ID and is granted the requested access, once the user has submitted a user ID and web server 106 has made an authentication decision, the information in translation table 116 is discarded. If the user makes another request to view account information using computing device 102, the process starts again and a new translation table 116 is constructed. For example, if the user provides an incorrect user ID to user ID interface 118 and the authentication attempt fails, web server 106 may generate another authentication interface that notifies the user of the authentication failure and prompts the user the reenter his or her user ID. However, since the information in translation table 116 was previously discarded, a new translation table will be constructed. The new translation table will include the values that constitute the user ID, but may contain other values besides those present in the previous translation table. Further, different images may be selected, and new random strings and new random image names will be generated to populate the new translation table. Thus, if an entity had intercepted data (e.g., the random image names associated with the user ID submitted by the user) from computing device 102 during the previous authentication attempt, this data would fail to render the same authentication result in subsequent transactions since the translation table used in the authentication process is generated on a per-transaction basis.

Figure 2:
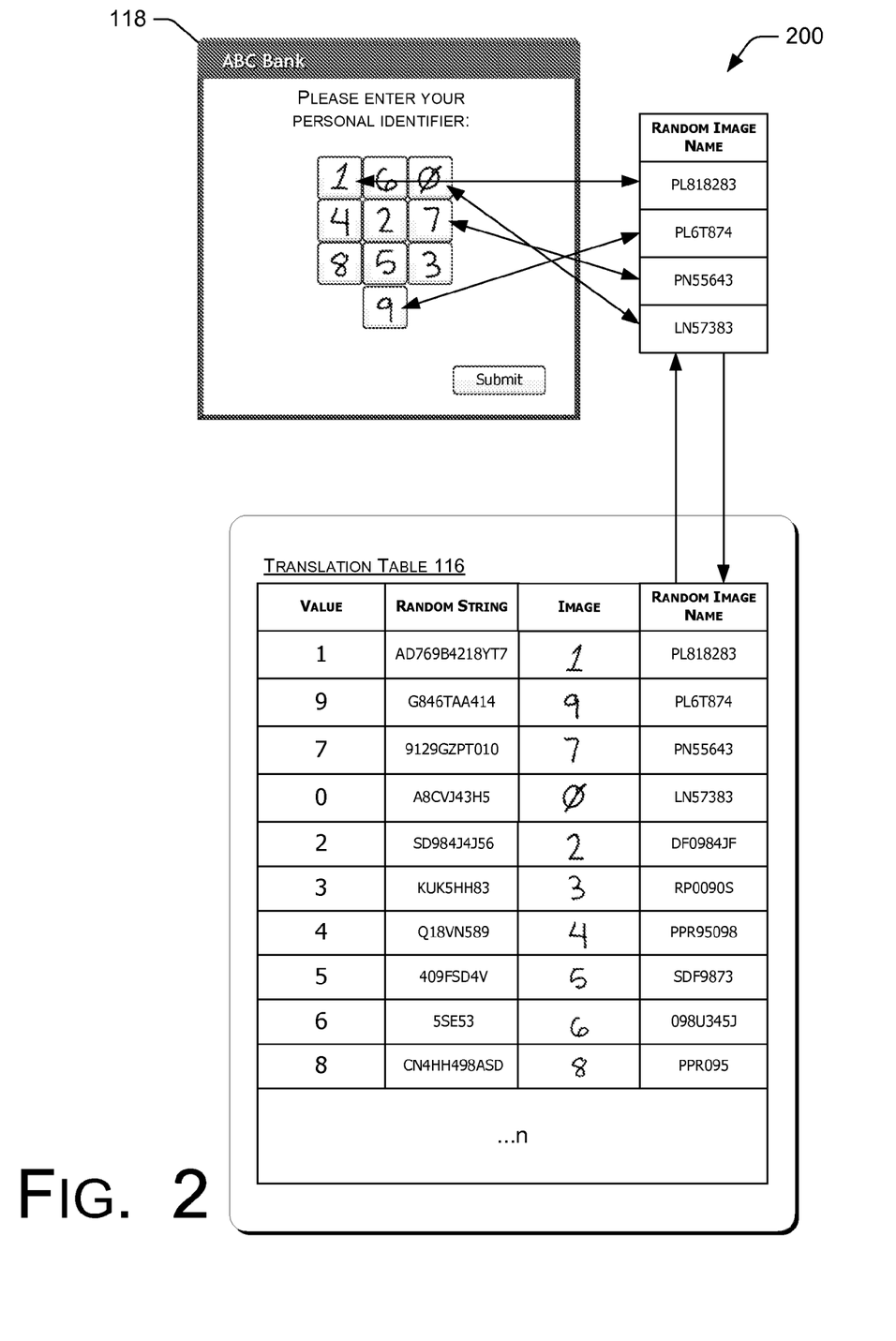
FIG. 2 illustrates an exemplary mapping of images from a translation table to a user interface.

FIG. 2 illustrates at 200 an exemplary mapping of user ID values between translation table 116 and user ID interface 118. As discussed above, translation table 116 is constructed using a set of values that includes the values that constitute a user ID. Each value in translation table 116 is further associated with a random representation of the value, a visual image representation of the value, and a random image name for the visual image representation.

As shown in FIG. 2, each image in the group of images that is associated with a user ID and displayed on user ID interface 118 is linked with its respective random image name. The random image names are sent to the user device (e.g., computing device 102 in FIG. 1) along with user ID interface 118. Also, the random image names are sent back to the server (e.g., web server 106 in FIG. 1) when the user ID provided by the user is submitted. For example, the image file "1" is sent to the user device with its random image name "PL818283", and so on with the remaining images. As a result, the user device only handles the images and their respective random image names and not the actual values that constitute the user ID. Alternatively and/or additionally, the random representations that are associated with the user ID values are used when communicating user ID interface 118 to the user device and when communicating the user's selection of a user ID to web server 106.

The use of random representations of user ID values and random image names thwarts attacks where an entity intentionally intercepts data transmitted from a user during an authentication transaction and, based on file names or identifiers associated with the data, attempts to determine the user's authentication information. For example, a typical authentication web page includes hypertext markup language (HTML) controls such as radio buttons, checkboxes, text input fields, and the like. These controls most often have descriptive file names that permit easy identification of a particular control. For example, in a common online authentication scenario, a user will be presented with a personal identification number (PIN) pad that displays a series of numbers (e.g., 0-9) and prompts the user the provide his or her PIN. The numbers displayed on the PIN pad are HTML controls with corresponding file names. Thus, the button that displays a zero (0) may include in its file name the term "num0" or some similar file description. Accordingly, if a user selects this button and the user's selection is observed by an entity, the entity could read the file name and determine from the term "num0" that the user had selected the number zero (0). Further, even if the file name associated with a user's selection is not explicitly descriptive of the underlying value of the selection, static file names allow for the detection of patterns over multiple authentication transactions. The use of randomized image names avoids both of these problems because random image names are generated anew for each authentication transaction. The likelihood that the random image name will have any explicit correlation to its underlying value is extremely small, and since each authentication transaction will have a different set of random image names there should be no detectable patterns over multiple authentication transactions.

Figure 3:
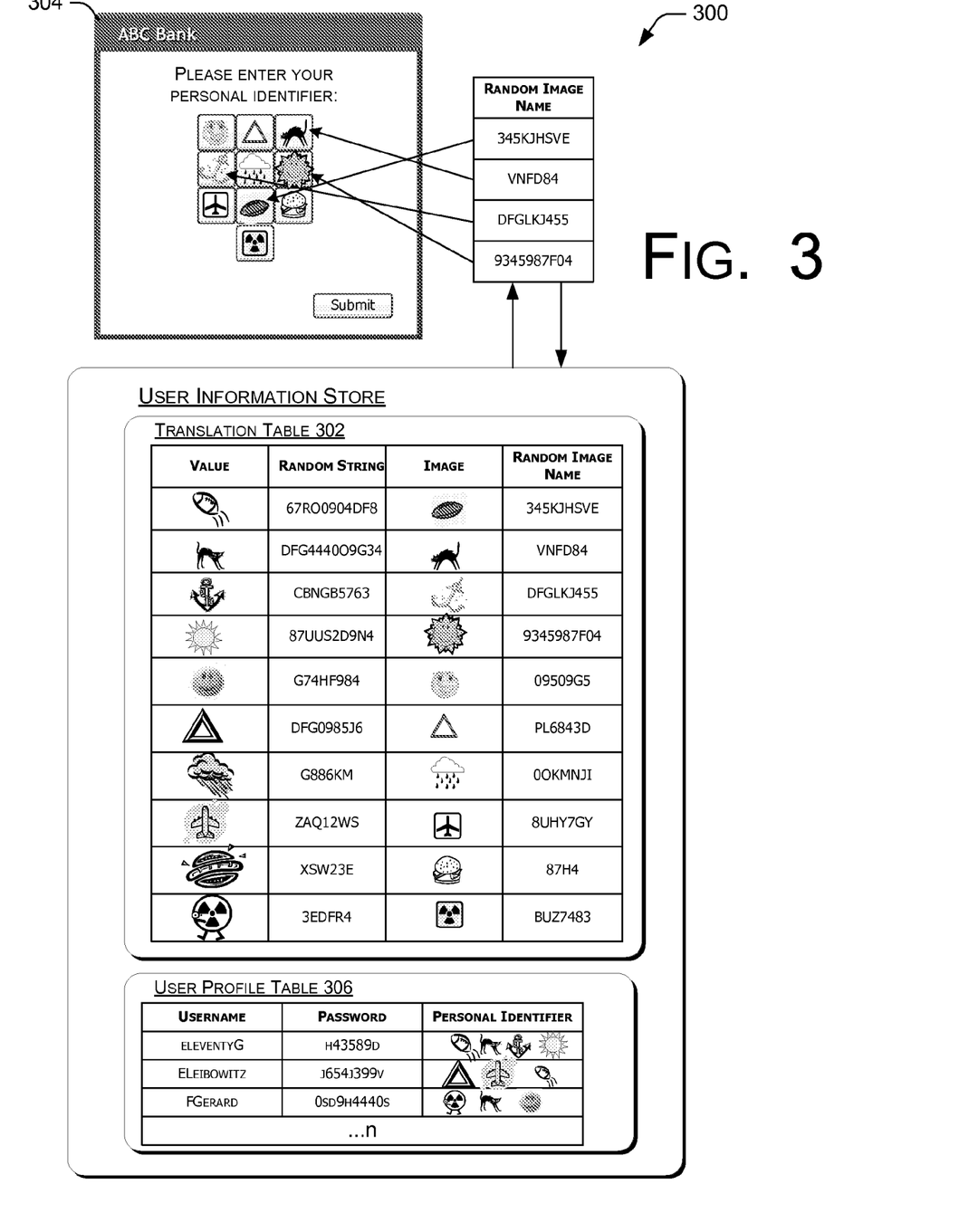
FIG. 3 illustrates an exemplary mapping of images from a translation table to a user interface using a graphic-based user identifier.

FIG. 3 shows at 300 an example of mapping user ID values between a translation table 302 and an authentication interface 304 according to an embodiment that utilizes graphics-based user IDs rather than the numeric values illustrated in FIG. 2. Continuing the same example scenario discussed above with respect to FIG. 1, a user wishing to access his or her account information, such as one or more accounts with a financial institution, submits a user name "eleventyG" and a password "h43589d" via an initial authentication interface on a client device 102 to web server 106. In response, the web server accesses user profile table 306 and matches the user name and password to a user ID that corresponds to this user profile. Web server 106 constructs a translation table 302 that has graphics that constitute the user ID for this user profile. Thus, the user profile for user name "eleventyG" has a user ID that includes graphic images that correspond to some graphic, such as a football, a cat, an anchor, and a sun. These graphics are included in translation table 302 along with various other graphic images. For each of the graphics in translation table 302, a random representation is generated and correlated with its respective graphic in the table. One example of a suitable random representation is a random character string, as shown. Further, for each graphic, an image is selected that corresponds to the graphic and the image is correlated with its respective graphic in translation table 302. Finally, a random image name is generated for each image and the random image name is correlated with its respective graphic in translation table 302.

The images and corresponding random image names are sent to the user's device 102 (FIG. 1). The images are displayed to the user in second or user ID interface 304. The user selects one or more of the images as part of the authentication process and submits the selection back to the web server as a string of random image names that correspond to the images selected by the user. As illustrated, the image names that are sent to the user and returned to the web server are random image names that are generated when translation table 302 is constructed. Thus, the user device handles the selected images and their respective random image values, but not the actual graphics that constitute the user ID. Further, since translation table 302 is generated on a per-transaction basis, the random image names used during one transaction are discarded after the transaction and would thus fail to render the same authentication result for any subsequent authentication transactions.

Exemplary Image Store

Figure 4:
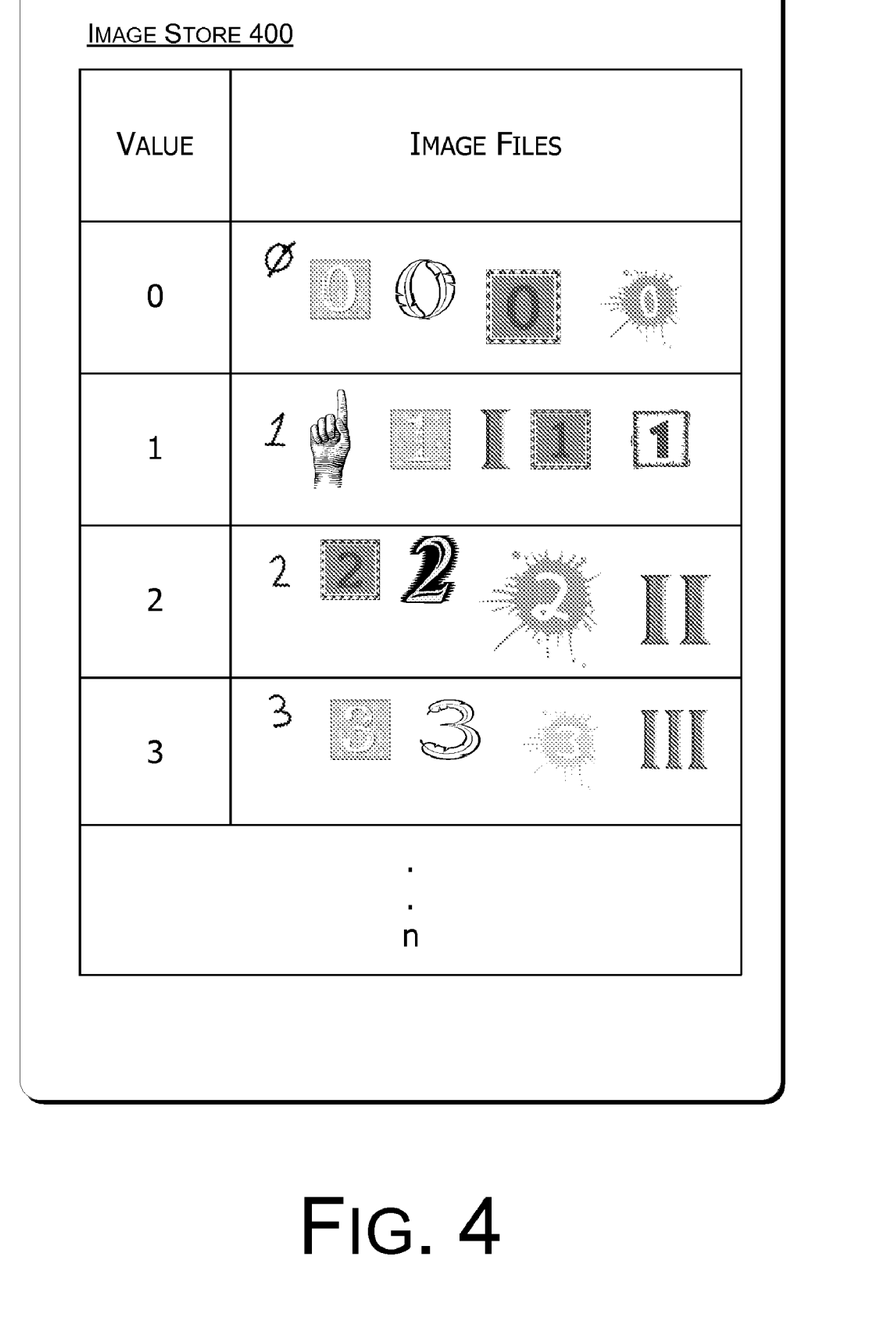
FIG. 4 illustrates an exemplary image store.

FIG. 4 shows one example of an image store 400 that may reside on a web server, such as web server 106 in FIG. 1. Image store 400 may alternately reside on a remote information store accessible to a web server. FIG. 1 shows one example of an architecture that may utilize image store 400.

Image store 400 includes a plurality of values that can be combined to form a user ID, shown in this example as the values zero (0), one (1), two (2), and three (3). The use of these values is for purposes of example only, and other values may be utilized, including numbers, letters, alphanumeric strings, graphics, action-based values, and the like. Image store 400 also includes a plurality of image files that correspond to each value. Thus, as shown, there are several image files that graphically represent the value zero. When a web server is constructing a translation table, such as translation table 116 in FIG. 1, the web server can access image store 400 to locate image files that visually represent the values in a particular user ID. For example, if a user ID is the number "230", it has the values two (2), three (3), and zero (0). In constructing a translation table, the web server can access image store 400 and select an image for each of these values and correlate each image file with its respective value in the translation table. Since there is a plurality of image files available for each value, the web server can construct a different translation table for each authentication transaction, even if subsequent authentication transactions are based on the same user ID. Accordingly, each authentication interface (e.g., user ID interface 118 in FIG. 1) that is generated based on a translation table may be visually distinct since it may contain different combinations of image files selected from image store 400. The visual distinctiveness of each authentication interface makes it more difficult for hackers and/or malware to detect patterns during authentication transactions and thereby attempt to discern a user's user ID based on any detected patterns.

The images associated with each image file may also be visually obfuscated to prevent image scanning software (such as optical character recognition software) resident on a user's computing device from capturing images displayed on the user's computing device and discerning the underlying values for the images. For example, one or more images selected by a user during an authentication transaction may be captured by image scanning software, but if the images are visually obfuscated, it may be difficult or impossible for the software to recognize the images and thus discern the values on which the images are based. Examples of visual obfuscation of images include adding background clutter to images (lines, similar shapes, etc.), image segmentation, image rescaling, image warping, and the like.

Exemplary Authentication Transaction

Figure 5:
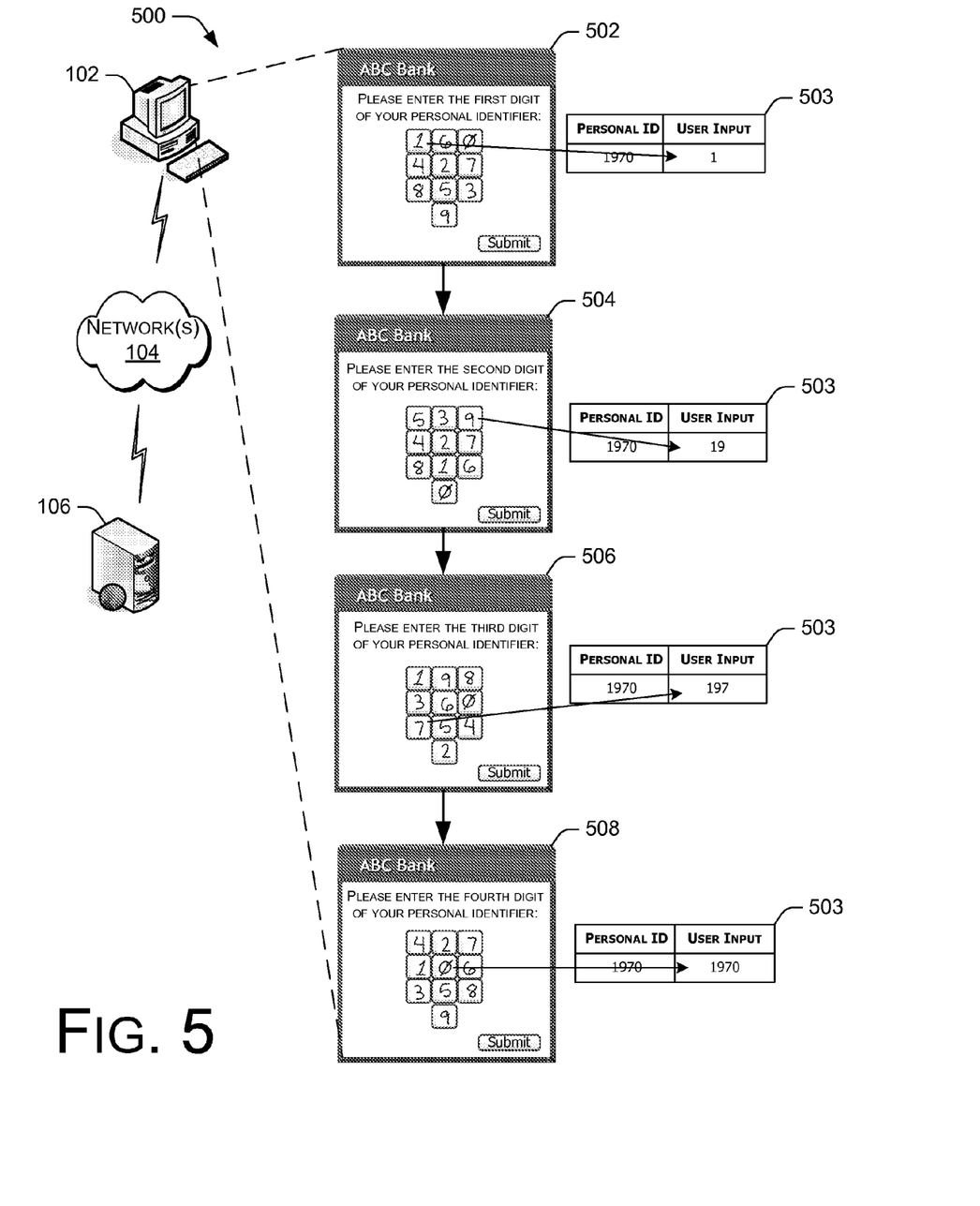
FIG. 5 illustrates an exemplary user authentication transaction that utilizes multiple randomized user interface images.

FIG. 5 shows at 500 an example of a user authentication transaction that employs multiple random or pseudo-random visual arrangements or patterns of images during a single authentication transaction. Architecture 100, shown in FIG. 1, is one example of an architecture that can utilize this embodiment. For discussion purposes, reference is made to certain features of architecture 100.

At 502, pursuant to a user request for access to certain information or resources, an authentication interface is generated by web server 106 and displayed to the user via computing device 102. One example of a suitable authentication interface is user ID interface 118, shown in FIG. 1. Communication between web server 106 and computing device 102 may be facilitated by network(s) 104. The authentication interface includes a first plurality of images in a first random visual arrangement, at least some of which include images that represent one or more values in a user's user ID. The images on the authentication interface are compiled and configured using a first translation table, such as translation table 116 in FIG. 1.

The authentication interface prompts the user to provide the first value of the user's user ID. Once the user provides the first value of his or her user ID by selecting the appropriate image on the authentication interface, the user selects the submit button to submit this entry to web server 106. In some embodiments, the user may not be required to select the submit button, and the user's selection is automatically forwarded to web server 106. Web server 106 then translates the user's selected image into its corresponding value on the first translation table and stores the corresponding value in authentication log 503. Web server 106 then discards the first translation table, generates a second translation table and uses the second translation table to provide a second plurality of images to the authentication interface, at least one of which represents the second value in the user's user ID.

At 504, the second plurality of images is displayed to the user on the authentication interface in a second random visual arrangement. As shown, the second visual arrangement varies from that of the first visual arrangement. The authentication interface then prompts the user to provide the second value of the user's user ID. Once the user provides the second value of his or her user ID by selecting the appropriate image on the authentication interface, the user's selection is submitted to web server 106. Web server 106 then translates the user's selected image into its corresponding value on the second translation table and stores the corresponding value in authentication log 503. Web server 106 then discards the second translation table, generates a third translation table and uses the third translation table to provide a third plurality of images to the authentication interface, at least one of which represents the third value in the user's user ID.

At 506, the third plurality of images is displayed to the user on the authentication interface in a third random visual arrangement. As shown, the third visual arrangement varies from that of the second visual arrangement. The authentication interface then prompts the user to provide the third value of the user's user ID. Once the user provides the third value of his or her user ID by selecting the appropriate image on the authentication interface, the user's selection is submitted to web server 106. Web server 106 then translates the user's selected image into its corresponding value on the third translation table and stores the corresponding value in authentication log 503. Web server 106 then discards the third translation table, generates a fourth translation table and uses the fourth translation table to provide a fourth plurality of images to the authentication interface, at least one of which represents the fourth value in the user's user ID.

At 508, the fourth plurality of images is displayed to the user on the authentication interface in a fourth random visual arrangement. As shown, the fourth visual arrangement varies from that of the third visual arrangement. The authentication interface then prompts the user to provide the fourth value of the user's user ID. Once the user provides the fourth value of his or her user ID by selecting the appropriate image on the authentication interface, the user's selection is submitted to web server 106. Web server 106 then translates the user's selected image into its corresponding value on the fourth translation table and stores the corresponding value in authentication log 503.

Once the user has entered all of the values that constitute his or her user ID, web server 106 then determines if the translated values stored in authentication log 503 correspond to the user's user ID. If the user ID submitted by the user matches the correct user ID in a user profile table, such as user profile table 114, the user is granted the requested access. Otherwise, if the user has entered an incorrect user ID, web server 106 can reinitiate the authentication process and give the user another opportunity to enter the correct user ID, or web server 106 can exit the authentication process without granting the requested access.

By using multiple translation tables and multiple random visual arrangements or patterns during a single authentication transaction, an entity is prevented from detecting patterns in user input during the transaction. Thus, if a user ID includes two or more identical values, in a typical authentication scenario an entity could detect the selection of these identical values by observing that two or more of the user's selections (e.g., more than one of the selected image names) are identical. This technique avoids this by generating new image names each time the user enters a value in his or her user ID, thus preventing the creation of detectable patterns based on the image names.

Exemplary System

Figure 6:
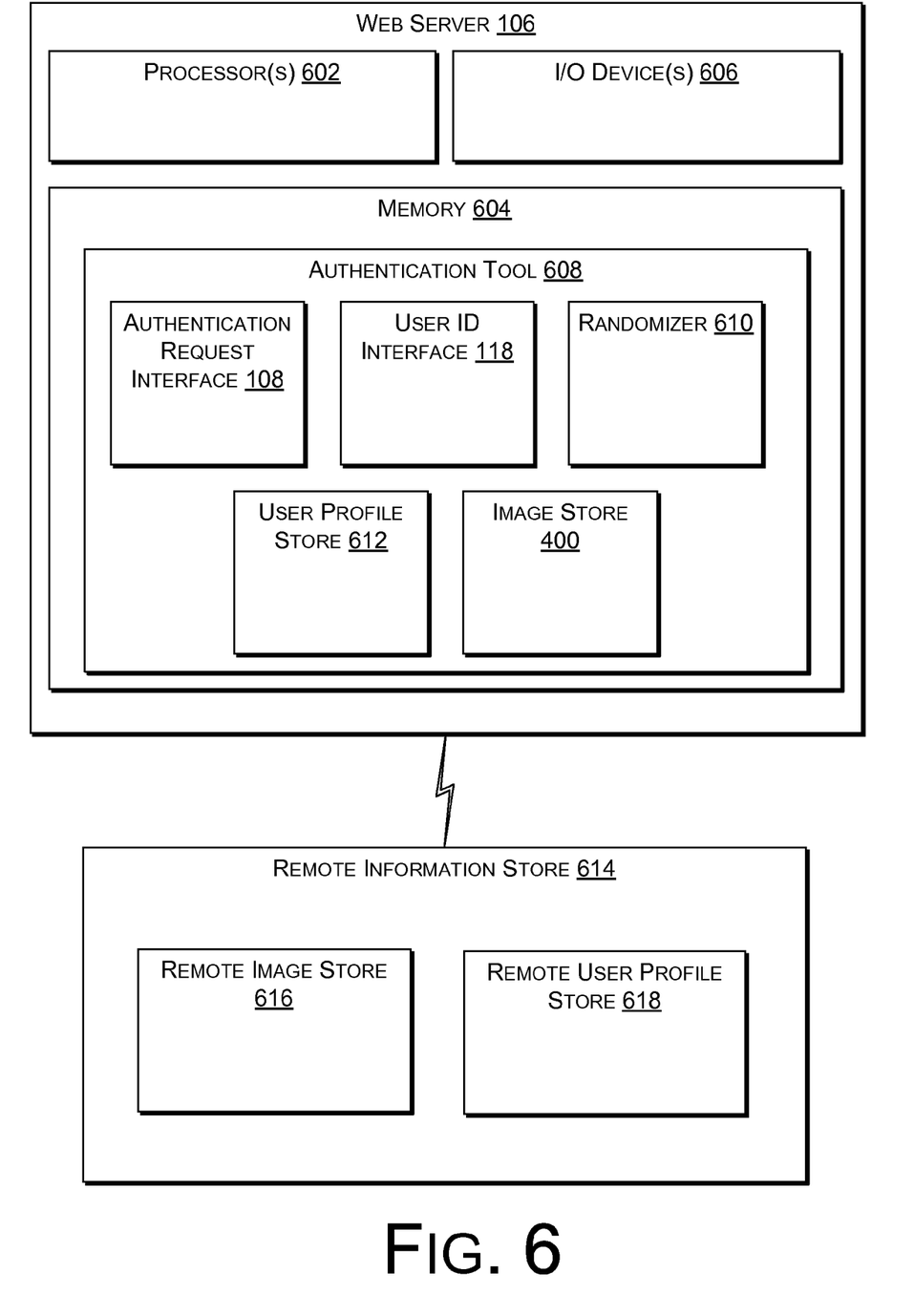
FIG. 6 is a block diagram of a web server and a tool executable on a web server to authenticate a user.

FIG. 6 illustrates various components of an exemplary web server 106 suitable for implementing the methods and techniques described herein. Web server 106 can include, but is not limited to, one or more processors 602, a memory 604, Input/Output (I/O) devices 606 (e.g., keyboard and mouse), and a system bus (not shown) that operatively couples various components including processor(s) 602 to memory 604. The system bus represents any of the several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, a PCI Express bus, a Universal Serial Bus (USB), a Secure Digital (SD) bus, or an IEEE 1394 (i.e., FireWire) bus.

Memory 604 includes computer-readable media in the form of volatile memory, such as Random Access Memory (RAM) and/or non-volatile memory, such as Read Only Memory (ROM) or flash RAM. Memory 604 typically includes data and/or program modules for implementing authentication tool 608 that are immediately accessible to and/or presently operated on by processor(s) 602.

In one implementation, authentication tool 608 is stored in the memory 604 and executable on the processor(s) 602. Authentication tool 608 includes authentication request interface 108 that allows a user to enter a user name and password as part of the authentication process. Authentication tool 608 also includes user ID interface 118 that allows a user to provide a user ID as a further part of the authentication process. Randomizer 610, as part of authentication tool 608, can be implemented to generate random representations of user ID values and to generate random image names for images used in the authentication process. Authentication tool 608 also includes user profile store 612, which stores user profile table(s) such as user profile table 114, shown in FIG. 1. Further to authentication tool 608 is image store 400, as shown in FIG. 4, which stores image files used in the authentication process. Web server 106 can optionally be connected to remote information store 614, which includes remote image store 616 for storing images to be used in the authentication process, and remote user profile store 618 for storing user profiles.

Exemplary Processes

Figure 7:
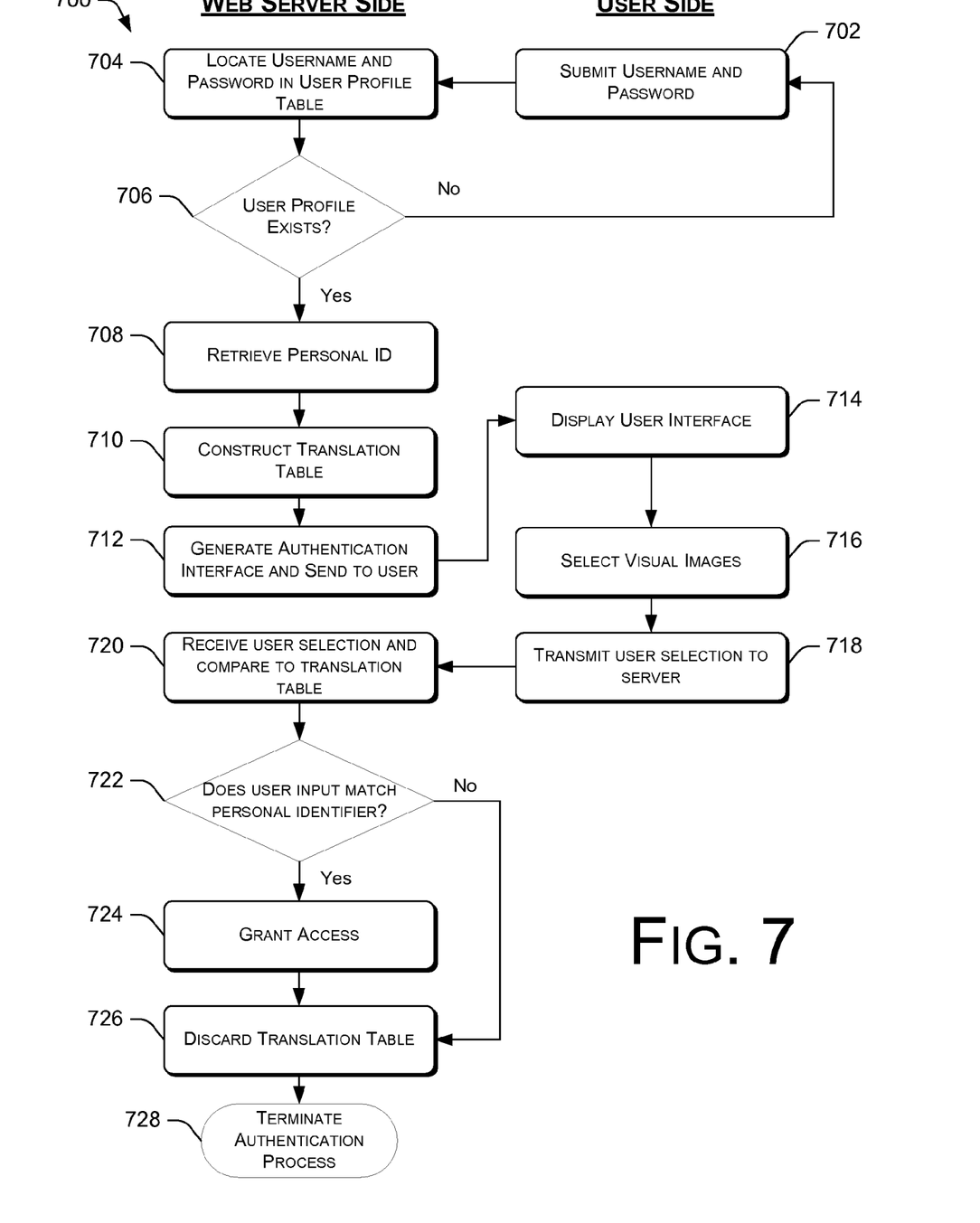
FIG. 7 is a flow diagram of an exemplary process for authenticating a user.

FIG. 7 illustrates an exemplary process 700 for authenticating a user. The process 700 is illustrated as a collection of blocks in a logical flow graph, which represents a sequence of operations that can be implemented in hardware, software, or a combination thereof. In the context of software, the blocks represent computer instructions that, when executed by one or more processors, perform the recited operations. For discussion purposes, process 700 is described with reference to architecture 100 shown in FIG. 1. Process 700 is divided into acts that are performed on the user side, and acts that are performed on the web server side.

At 702, a user submits a user name and password as part of an authentication process. Act 702 may be performed as part of a user's request to access certain protected information and/or resources, such as a user's account with a financial institution. At 704, the web server searches a user profile table for the user name and password. At 706, the web server determines if the user name and password match an existing user profile. If no match is found, the user is returned to 702 and prompted to reenter his or her user name and password. Alternatively, if no match is found, the web server may terminate the authentication process and refuse access to the requested information and/or resources.

If a user profile is found that matches the submitted user name and password, then at 708 a user ID is retrieved that corresponds to the user profile. At 710 a translation table, such as translation table 114 in FIG. 1, is constructed using the retrieved user ID. Act 710 will be discussed in more detail below with reference to FIG. 8. At 712, the information from the translation table is used to arrange and/or generate an authentication interface, and the authentication interface is sent to the user. At 714, the authentication interface is displayed to the user. The authentication interface enables the user to enter his or her user ID by selecting one or more visual images that correspond to the values that constitute his or her user ID. At 716, the user selects of one or more visual images and the user's selection is sent back to the web server at 718.

At 720, the user's selection is received by the web server and the input is compared to the user profile information in the translation table. In some embodiments, the user's input is received as the random image names associated with the visual images selected by the user. At 722 it is determined if the user has provided a user ID that correlates to the user profile in question. If yes, then the user is considered authentic and is granted the requested access at 724. The authentication table is then discarded at 726 and the authentication process is terminated at 728. Otherwise, if the user's input fails to match the correct user ID, the web server will discard the translation table at 726 and terminate the authentication process at 728 without granting the requested access. Alternatively and/or additionally, if the user's input fails to match the correct user ID, the web server may return to 710 and construct a new translation table and execute the authentication process again as discussed above. In either case, if the user is granted the requested access or if the user fails to provide the correct user ID, the translation table is discarded. Thus, each translation table is constructed on a per-transaction basis.

Figure 8:
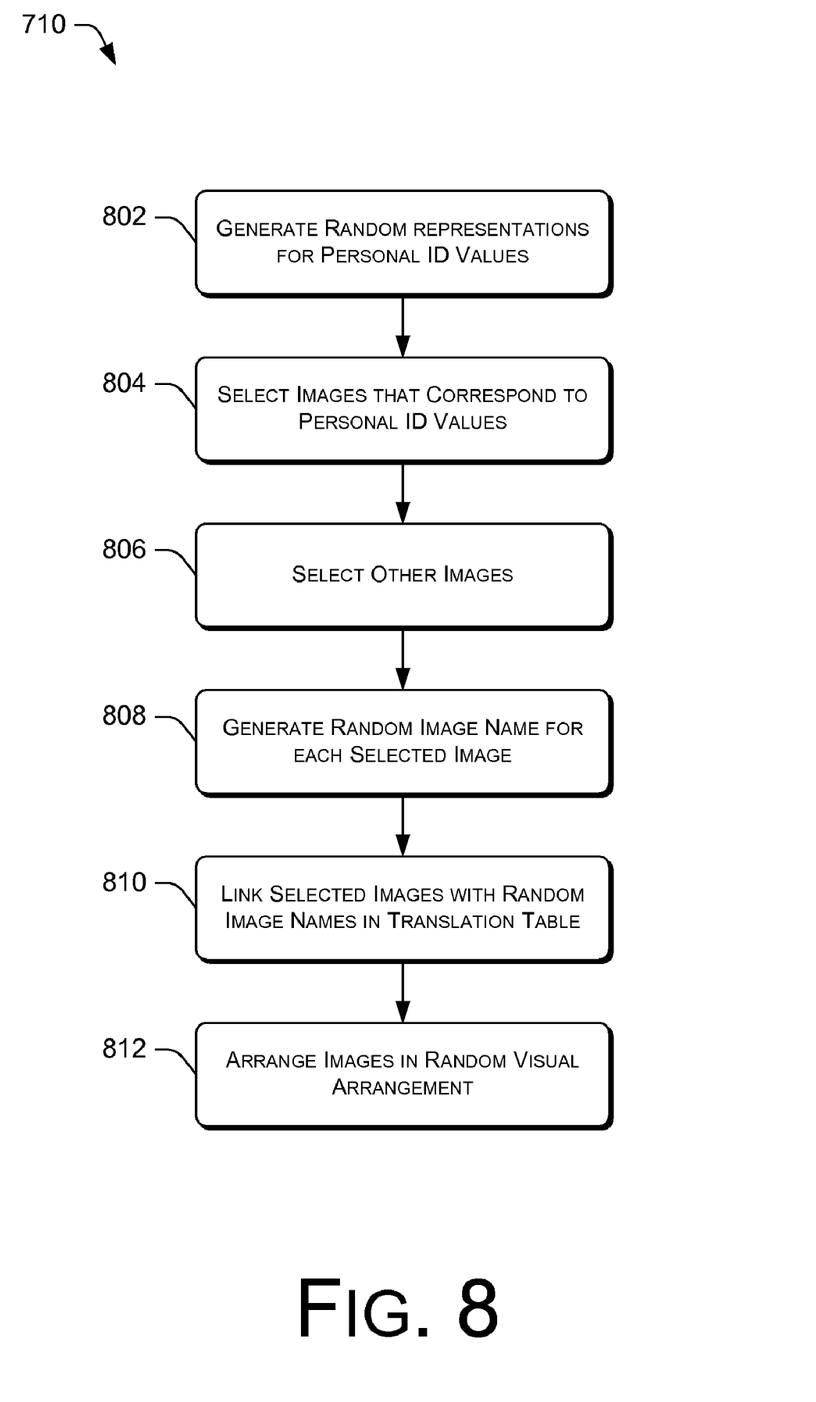
FIG. 8 is a flow diagram of an exemplary process for constructing a translation table.

FIG. 8 shows one exemplary implementation of act 710 in FIG. 7. At 802, a random representation is generated for each value in the user ID. In some embodiments, the random representation includes a randomized string of characters. At 804, an image is selected that visually represents each value in the user ID. At 806, other images are selected that do not correspond to values in the user ID. At 808, random image names are generated for each selected image. In some embodiments, the random image names may include a randomized string of characters. At 810, each random image name is linked with its respective image in the translation table. At 812, the selected images are arranged in a random or pseudo-random visual pattern. This pattern is then used to generate the authentication interface, as discussed above with respect to FIG. 7.

Figure 9:
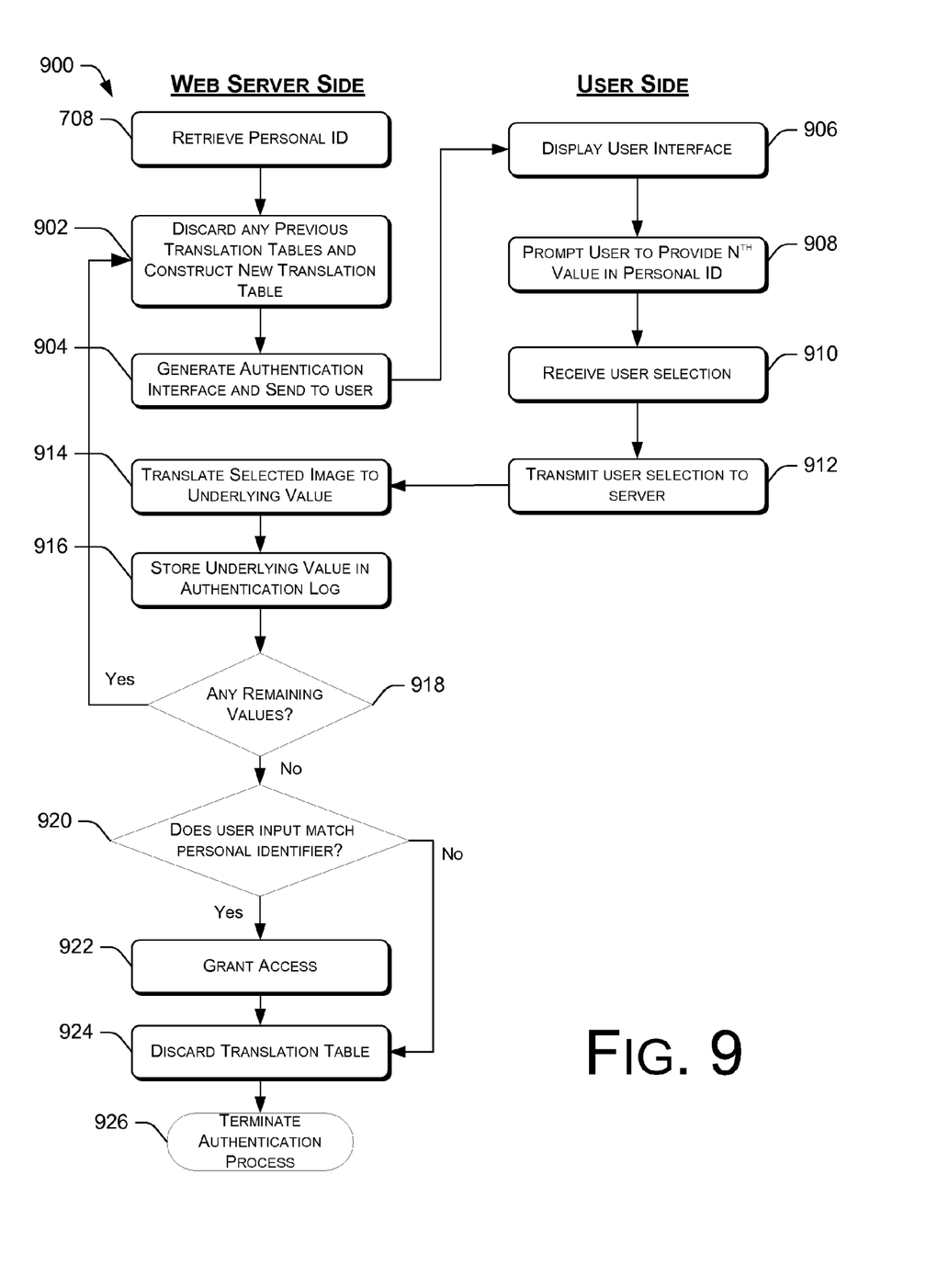
FIG. 9 is a flow diagram of an exemplary process for authenticating a user that uses multiple randomized user interface images.

FIG. 9 shows one example of an authentication process 900 that implements multiple random visual arrangements of images on the user interface. The process 900 is illustrated as a collection of blocks in a logical flow graph, which represents a sequence of operations that can be implemented in hardware, software, or a combination thereof. In the context of software, the blocks represent computer instructions that, when executed by one or more processors, perform the recited operations. For discussion purposes, process 900 is described with reference to architecture 100 shown in FIG. 1. Process 900 is divided into acts that are performed on the user side, and acts that are performed on the web server side. Certain acts in authentication process 900 make reference to process 700, shown in FIG. 7, and process 900 may be implemented alternatively to and/or in combination with certain acts in process 700.

At 708, a user ID is retrieved for a user that is requesting access to information and/or resources. At 902, if there are any previously constructed translations tables, these tables are discarded and a new translation table, such as translation table 116 in FIG. 1, is constructed. The new translation table includes values that constitute the user ID. At 904, an authentication interface is generated that includes a plurality of images from the translation table and the authentication interface is sent to the user. At 906, the authentication interface is displayed to the user and at 908, the user is prompted to provide the $N^{th}$ value of his or her user ID, wherein N=(1, 2, 3, ... n), and wherein n is the number of values that constitute the user's user ID. At 910, the user selects one of the displayed images and at 912, the user's selection is sent to the web server.

At 914, the user's input in the form of a selected image is translated to its underlying value using the previously constructed translation table and at 916, the underlying value is then stored in an authentication log, such as authentication log 503 in FIG. 5. At 918, it is determined if there are any remaining values in the user's user ID that have not been provided by the user. If there are remaining values tat have not been provided by the user, the process returns to 902, where any previously generated translation tables are discarded and a new translation table is generated. The process continues until it is determined at 918 that the number of values provided by the user is equal to the number of values in the user's user ID, i.e., where the user has provided the $N^{th}$ value and N=n. The web server may make this determination automatically, or the user may be prompted to notify the web server once all of the user ID values have been provided. In one embodiment, the user may notify the web server as such by clicking a submit button on the authentication interface.

Once it is determined that the number of values provided by the user is equal to the number of values in the user's user ID, at 920 it is determined if the values stored in the authentication log correspond to the values that constitute the user ID stored for the user. If the values do correspond, then at 922, the user is granted the requested access and, at 924, any remaining translation tables are discarded. If the translated values stored in the authentication log fail to correspond to the values that constitute the user ID stored for the user, then any remaining translation tables are discarded at 924 and the authentication process is terminated at 926 without granting the requested access. Alternatively and/or additionally, if the user's input fails to match the correct user ID, the web server may return to 902 and give the user a further opportunity to provide the correct user ID. Thus, as shown, each translation table is constructed before the user provides a single user ID value and is discarded after the user provides the value.

Conclusion

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method comprising:
selecting a corresponding visual image for each of a plurality of values in a user identifier;
generating a corresponding random representation for each of the plurality of values in the user identifier, each random representation including a unique string of random characters;
generating a corresponding random image name for each of the visual images selected for the plurality of values in the user identifier, each random image name including a unique sequence of random characters;
for each of the plurality of values, linking the corresponding visual image and the corresponding random image name; and
arranging the visual images for presentation to a user during authentication of the user.

2. The method of claim 1, wherein the visual images are graphical representations of the values that constitute the user identifier.

3. The method of claim 1, wherein arranging the visual images comprises generating a user interface that includes the visual images.

4. The method of claim 1, further comprising:
constructing a translation table that includes the plurality of values, a plurality of random representations, a plurality of the visual images, and a plurality of the random image names wherein each of the values corresponds to a different random representation, a different visual image, and a different random image name; and
using the translation table to authenticate a user.

5. The method of claim 1, wherein the visual images are arranged in a random pattern.

6. The method of claim 1, wherein the visual images are arranged in plurality of random patterns.

7. The method of claim 1, wherein each random representation comprises a unique string of alphanumeric characters.

8. The method of claim 1, wherein each random image name comprises a unique string of alphanumeric characters.

9. A method comprising:
arranging one or more visual images for presentation to a user during an authentication transaction, each visual image being associated with a corresponding image name that includes a unique random string of characters;
displaying the one or more visual images to the user during the authentication transaction;
receiving one or more strings of characters selected by the user, each string of characters being selected using a corresponding visual image during the authentication transaction;
determining if the one or more received strings of characters correspond to one or more random strings of characters of a user identifier; and
if the one or more received strings of characters correspond to the user identifier, authenticating the user.

10. The method of claim 9, wherein the visual images are arranged in a random pattern.

11. The method of claim 9, where in the visual images comprise graphic representations of one or more values that constitute the user identifier.

12. The method of claim 9, wherein the user identifier includes one or more graphic images.

13. The method of claim 9, wherein the displaying includes displaying the one or more visual images following verification of the user using a user name and password.

14. The method of claim 9, wherein the arranging comprises arranging the visual images in a plurality of random patterns.

15. The method of claim 14, wherein the visual images are arranged in a plurality of random patterns during a single authentication transaction.

16. A computer-readable memory storing computer-executable instructions that, when executed, perform acts comprising:

retrieving a user identifier having a plurality of values;

generating a corresponding random string representation having a plurality of alphanumeric characters for each of the plurality of values;

assigning a corresponding visual image to each of the plurality of values;

generating a corresponding randomized image file name for each of the visual images such that a quantity of the randomized image file name equals a quantity of the visual images, each random image file name having a plurality of alphanumeric characters;

arranging the visual images for an authentication interface; and receiving a sequence of random image file names that correspond to a sequence of visual images selected from the plurality of the visual images by a user at the authentication interface.

17. The computer-readable memory of claim 16, further storing computer-executable instructions that, when executed, perform acts comprising converting the sequence of random image file names into a corresponding string of values using a translation table.

18. The computer-readable memory of claim 17, further storing computer-executable instructions that, when executed, perform acts comprising determining that the user is authenticated when the sequence of values match the string of values in the user identifier.

19. The computer-readable memory of claim 16, wherein the authentication interface includes the plurality of the visual images to be displayed in a random pattern.

20. The computer-readable memory of claim 16, wherein the authentication interface includes the plurality of the visual images to be displayed in a plurality of random patterns.

* * * * *